No. 755,792. PATENTED MAR. 29, 1904.
W. H. PRATT.
INERTIA DAMPER FOR ELECTRIC MEASURING INSTRUMENTS.
APPLICATION FILED MAR. 14, 1902.
NO MODEL. 2 SHEETS—SHEET 1.

Witnesses:
Robt. C. Chapman
Alex F. Macdonald

Inventor,
William H. Pratt,
By Albert G. Davis
Att'y.

No. 755,792. PATENTED MAR. 29, 1904.
W. H. PRATT.
INERTIA DAMPER FOR ELECTRIC MEASURING INSTRUMENTS.
APPLICATION FILED MAR. 14, 1902.
NO MODEL. 2 SHEETS—SHEET 2.

Witnesses:
Robt E. Chapman
Alex F. Macdonald

Inventor,
William H. Pratt,
By Albert G. Davis
Att'y.

No. 755,792. Patented March 29, 1904.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

INERTIA-DAMPER FOR ELECTRIC MEASURING INSTRUMENTS.

SPECIFICATION forming part of Letters Patent No. 755,792, dated March 29, 1904.

Application filed March 14, 1902. Serial No. 98,237. (No model.)

*To all whom it may concern:*

Be it known that I, WILLIAM H. PRATT, a citizen of the United States, residing at Lynn, county of Essex, State of Massachusetts, have invented certain new and useful Improvements in Inertia-Dampers for Electric Measuring Instruments, of which the following is a specification.

This invention relates to instruments for measuring electric currents; and its object is to provide an efficient and simple means for damping the oscillations of the moving element, which changes its position with variations in the current.

The invention consists in a weight or weights having a frictional connection with the moving element, so that the inertia of the weight or weights prevents it or them from moving simultaneously with the moving element, but the energy of the moving element is consumed partly in the heat of friction between the moving element and the weight and partly in setting the weight in motion. Its inertia then prevents it from instantly responding to a backward movement of the moving element, so that the friction between these oppositely-moving parts tends to quickly check them both. The moving element is thus free to respond promptly to any change in the current, but its oscillations are rapidly damped by the weight.

Figure 1:
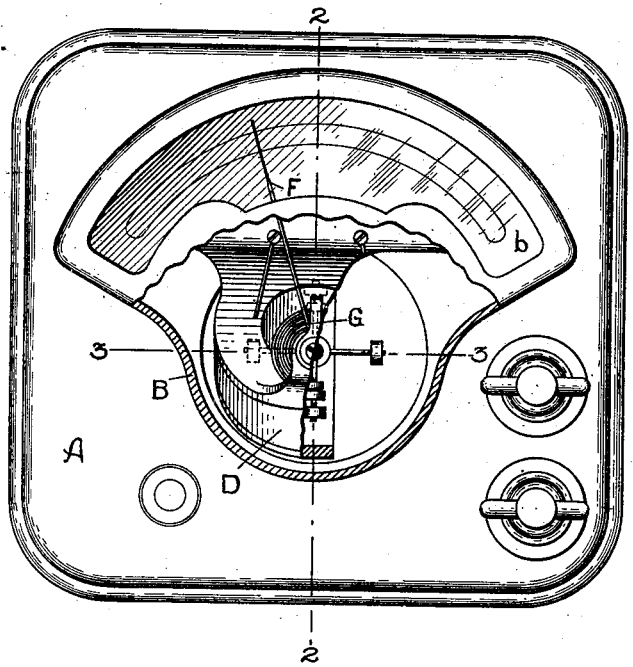
Figure 2:
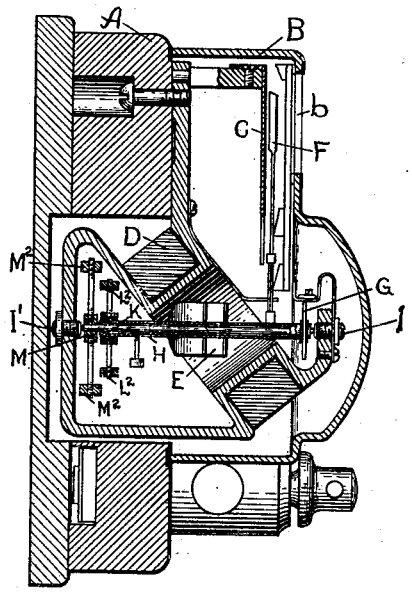
Figure 3:
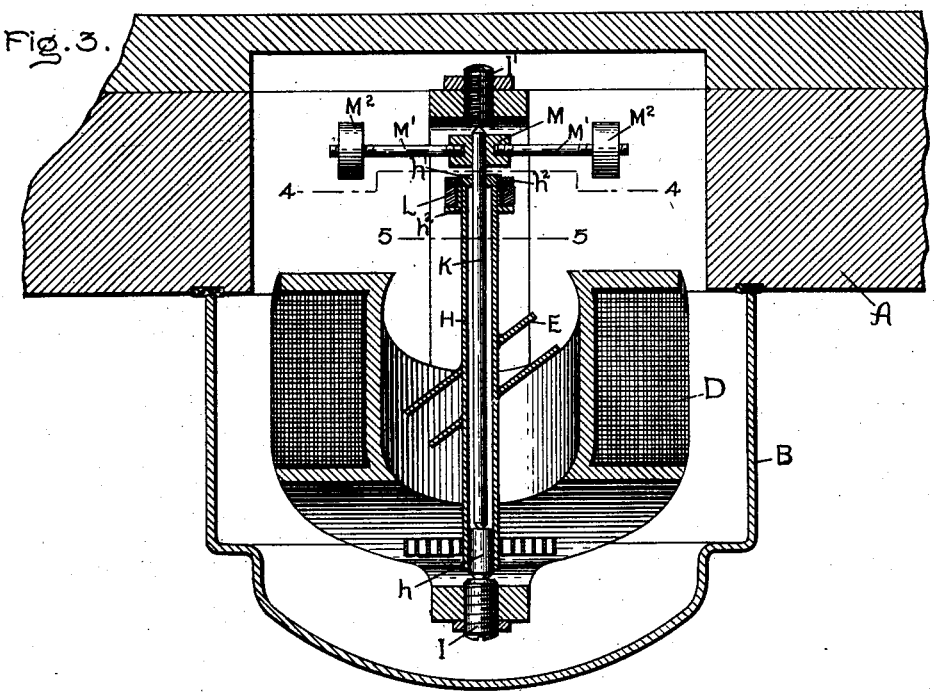
Figure 4:
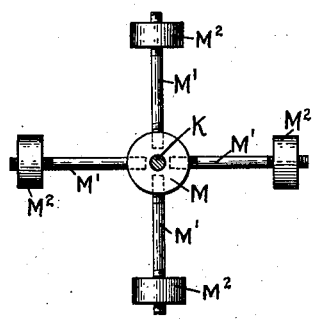
Figure 5:
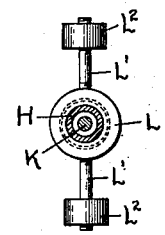

In the accompanying drawings, Figure 1 is a front elevation of a measuring instrument equipped with my inertia-damper. Fig. 2 is a cross-section of the same on the line 2 2, Fig. 1. Fig. 3 is a cross-section of the same on the line 3 3, Fig. 1, on a larger scale. Fig. 4 shows one system of weights on a section taken on the line 4 4, Fig. 3. Fig. 5 shows another system of weights on a section of the line 5 5, Fig. 3.

The instrument to which my invention can be applied may be of any desired construction. In the drawings I have shown an inclined-coil voltmeter, having a base A, cover B, provided with a glazed opening $b$ to expose the scale C, an inclined coil D, armature E, index-needle F, and coiled spring G for returning the needle to zero. The armature, needle, and one end of the spring are attached to a tubular spindle H, having at one end a conical pivot $h$, which is received in the jeweled adjustable bearing I. An inner spindle K is located centrally in the tubular spindle, being journaled at one end in the inner end of the conical pivot $h$. Its other end extends beyond the tubular spindle and is received in a jeweled bearing I'. The tubular spindle has an internal collar $h'$, having an easy-turning fit on the inner spindle.

On the tubular spindle is mounted loosely a collar L, preferably retained in position by flanges $h^2$ on the spindle. The collar carries arms L', on which are weights L², preferably adjustable—as, for instance, by making the weights in the form of nuts screwing onto the ends of the arms.

Secured to the inner spindle K on the part extending beyond the tubular spindle is a collar M, carrying arms M', each provided with an adjustable weight M². The weights L² and M² are so adjusted that they are perfectly counterbalanced around the common axis of the spindles H and K. It will be noted that the collar L with its weights and the inner spindle K with its weights are connected with the tubular spindle H merely by the friction between said parts.

The operation of the device is as follows: When the instrument is energized, the armature tends to turn the tubular spindle and the needle rapidly toward the indicating position against the tension of the spring G. In so doing it leaves behind the weighted parts; but the friction between said parts and the tubular spindle causes the energy of motion of the latter to be dissipated in heat and in imparting movement to the weights. Should the needle oscillate past its proper position and then swing back, the friction tends to check the now moving weighted parts and also damp the backward swing of the needle. When an indication is arrived at, the whole moving system is free to move in either direction, there being no drag between the armature-spindle and the weighted parts. This makes an excellent dead-beat instrument.

What I claim as new, and desire to secure by Letters Patent of the United States, is—

1. In an indicating instrument, the combination with an arbor and a pointer, of means loosely mounted on said arbor for preventing the vibration of the pointer, substantially as and for the purpose specified.

2. An electric measuring instrument provided with a vibratory pointer and a damper consisting of a part having inertia and movable independently of the indicating element of said instrument, said part being frictionally connected with the indicating element.

3. In an electric measuring instrument, the combination with the vibratory indicating element, of a damper comprising a weighted part counterbalanced with reference to and mounted on the axis of said element, and movable independently of said element and having frictional connection therewith.

4. In an electric measuring instrument, the combination with the vibratory indicating element, of a weighted part counterbalanced with reference to the axis of said element, said part being freely movable around said axis independently of the indicating element, and having frictional connection with said element.

5. In an electric measuring instrument, the combination with a vibratory indicating element, of a damper comprising a weighted part counterbalanced with reference to the axis of said spindle, and having a frictional connection with said spindle so as to be movable independently thereof.

6. In an electric measuring instrument, the combination with a rotatable tubular spindle, of a weighted collar having a frictional connection therewith.

7. In an electric measuring instrument, the combination with a spindle, of a collar loosely mounted thereon, and weighted arms on said collar counterbalanced around the axis of said spindle.

8. In an electric measuring instrument, the combination with a tubular spindle, of a collar loosely mounted thereon, weighted arms on said collar, an inner spindle, and weighted arms on said inner spindle.

9. In an electric measuring instrument, the combination with two concentric independent spindles, of weights concentric with said spindles and secured to one of them.

10. In an electric measuring instrument, the combination with two concentric independent spindles one of which is freely rotatable on the other, of weights concentric with said spindles, some of said weights being secured to one spindle and the rest loosely mounted on the other.

11. In an electric measuring instrument, the combination with a tubular spindle having a pivot at one end and an internal collar at the other, of an inner spindle having a bearing in said pivot and collar and extending beyond the end of the tubular spindle, a collar loose on the tubular spindle, a collar fast on the extended portion of the inner spindle, and arms on each collar carrying adjustable weights.

In witness whereof I have hereunto set my hand this 12th day of March, 1902.

WILLIAM H. PRATT.

Witnesses:
DUGALD McK. McKILLOP,
JOHN A. McMANUS.